United States Patent
Horiguchi et al.

(10) Patent No.: US 8,017,256 B2
(45) Date of Patent: Sep. 13, 2011

(54) DUAL-POWER-SUPPLY SYSTEM

(75) Inventors: Toshio Horiguchi, Tokyo (JP); Junichi Itoh, Nagaoka (JP); Kouji Orikawa, Nagaoka (JP)

(73) Assignees: Olympus Corporation, Tokyo (JP); National University Corporation Nagaoka University of Technology, Nagaoka-shi (JP)

( * ) Notice: Subject to any disclaimer, the term of this patent is extended or adjusted under 35 U.S.C. 154(b) by 0 days.

(21) Appl. No.: 12/778,652

(22) Filed: May 12, 2010

(65) Prior Publication Data

US 2010/0221626 A1 Sep. 2, 2010

Related U.S. Application Data

(63) Continuation of application No. PCT/JP2008/070345, filed on Nov. 7, 2008.

(30) Foreign Application Priority Data

Nov. 14, 2007 (JP) .................................. 2007-295496

(51) Int. Cl.
H01M 10/46 (2006.01)
H01M 16/00 (2006.01)
(52) U.S. Cl. ............................... 429/9; 429/61; 320/101
(58) Field of Classification Search ................ 429/9, 61; 320/101
See application file for complete search history.

(56) References Cited

U.S. PATENT DOCUMENTS

| 6,656,618 | B2 | 12/2003 | Iwase | |
|---|---|---|---|---|
| 7,326,480 | B2* | 2/2008 | Fuglevand | ........................ 429/9 |
| 2006/0240291 | A1* | 10/2006 | Kim et al. | ......................... 429/9 |
| 2007/0009770 | A1 | 1/2007 | Takada et al. | |
| 2007/0278968 | A1 | 12/2007 | Takada et al. | |
| 2009/0009130 | A1* | 1/2009 | Neeb et al. | .................... 320/101 |

FOREIGN PATENT DOCUMENTS

| JP | 2006-114486 A | 4/2006 |
|---|---|---|
| JP | 2007-43888 A | 2/2007 |
| JP | 2007-109609 A | 4/2007 |
| JP | 2007-328955 A | 12/2007 |

OTHER PUBLICATIONS

English Language International Search Report dated Feb. 24, 2009 issued in parent Appln. No. PCT/JP2008/070345.

* cited by examiner

*Primary Examiner* — Stephen J. Kalafut
(74) *Attorney, Agent, or Firm* — Holtz, Holtz, Goodman & Chick, PC

(57) ABSTRACT

A dual-power-supply system uses both a fuel cell and a chargeable secondary battery. A differential voltage adding unit adds a differential voltage between the voltage of the fuel cell and a necessary target output voltage to the voltage of the fuel cell by using the secondary battery, thereby obtaining an output voltage of the dual-power-supply system. A control unit detects the output voltage, and controls the differential voltage adding unit such that the output voltage is equal to the target output voltage.

4 Claims, 9 Drawing Sheets

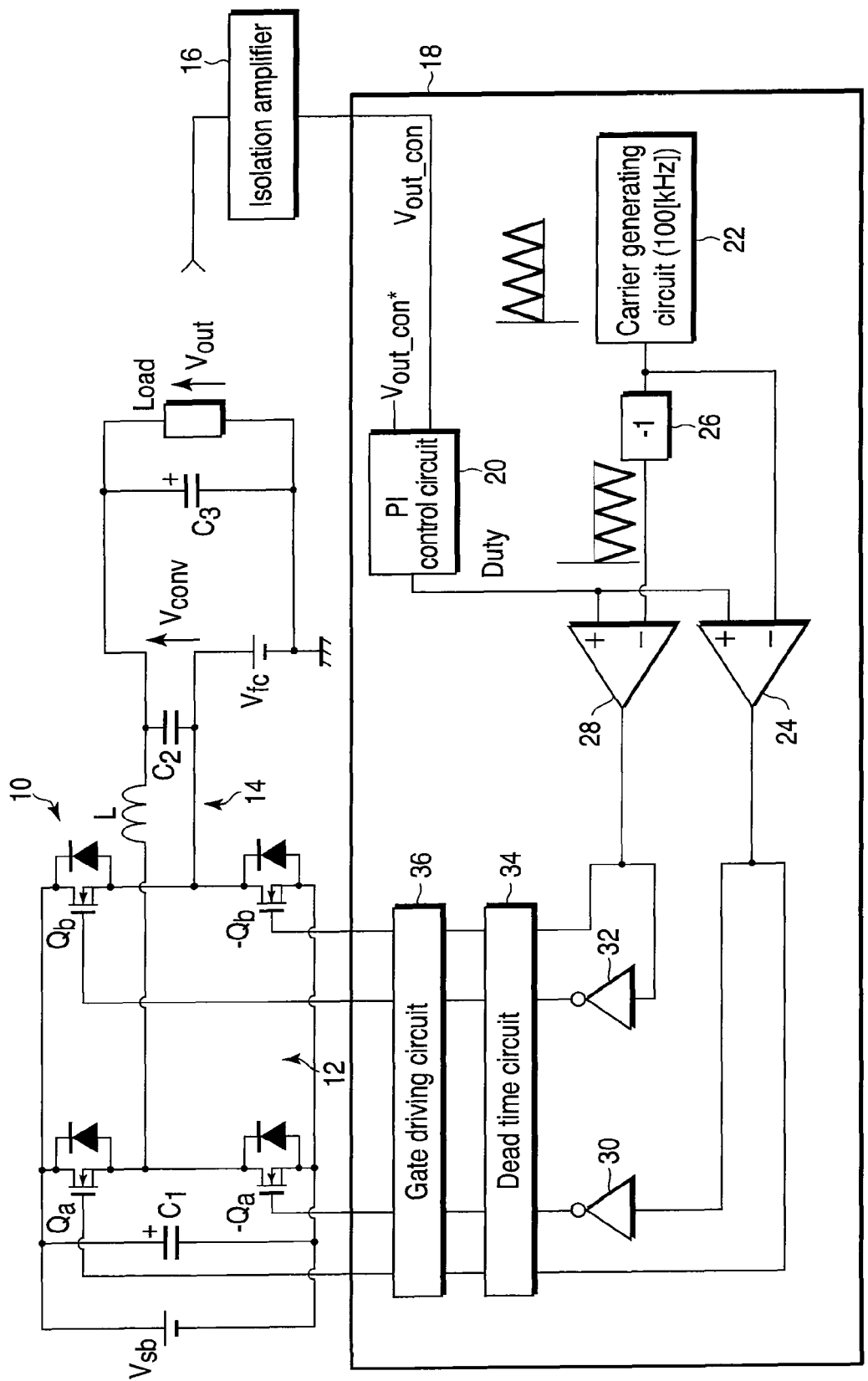
F I G. 1

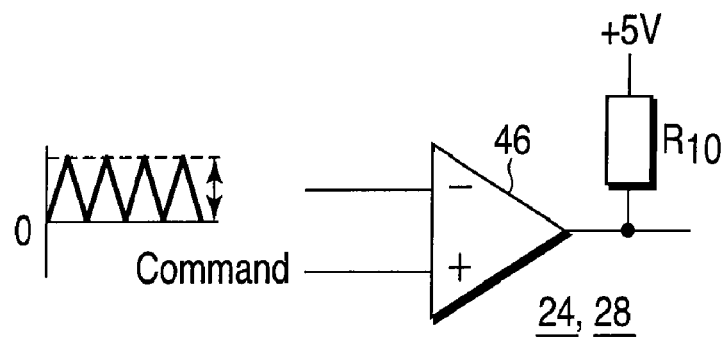
F I G. 4
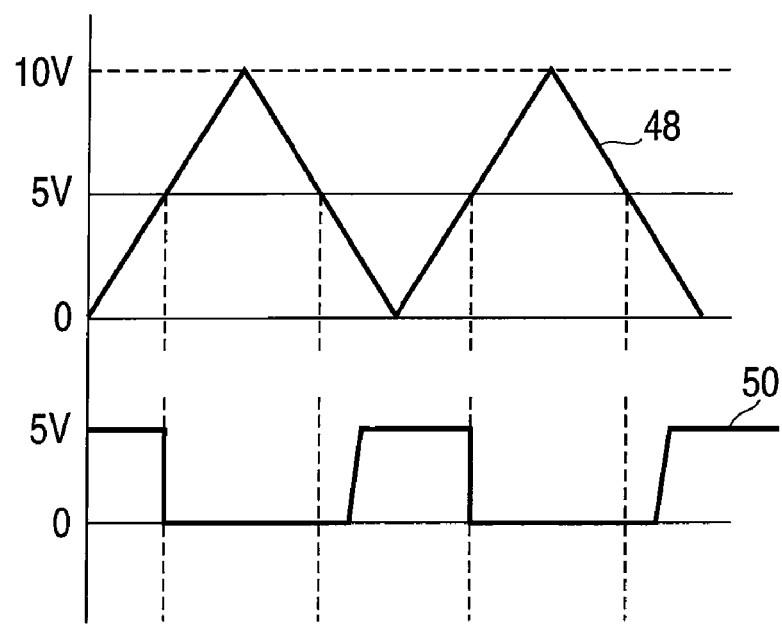
F I G. 5

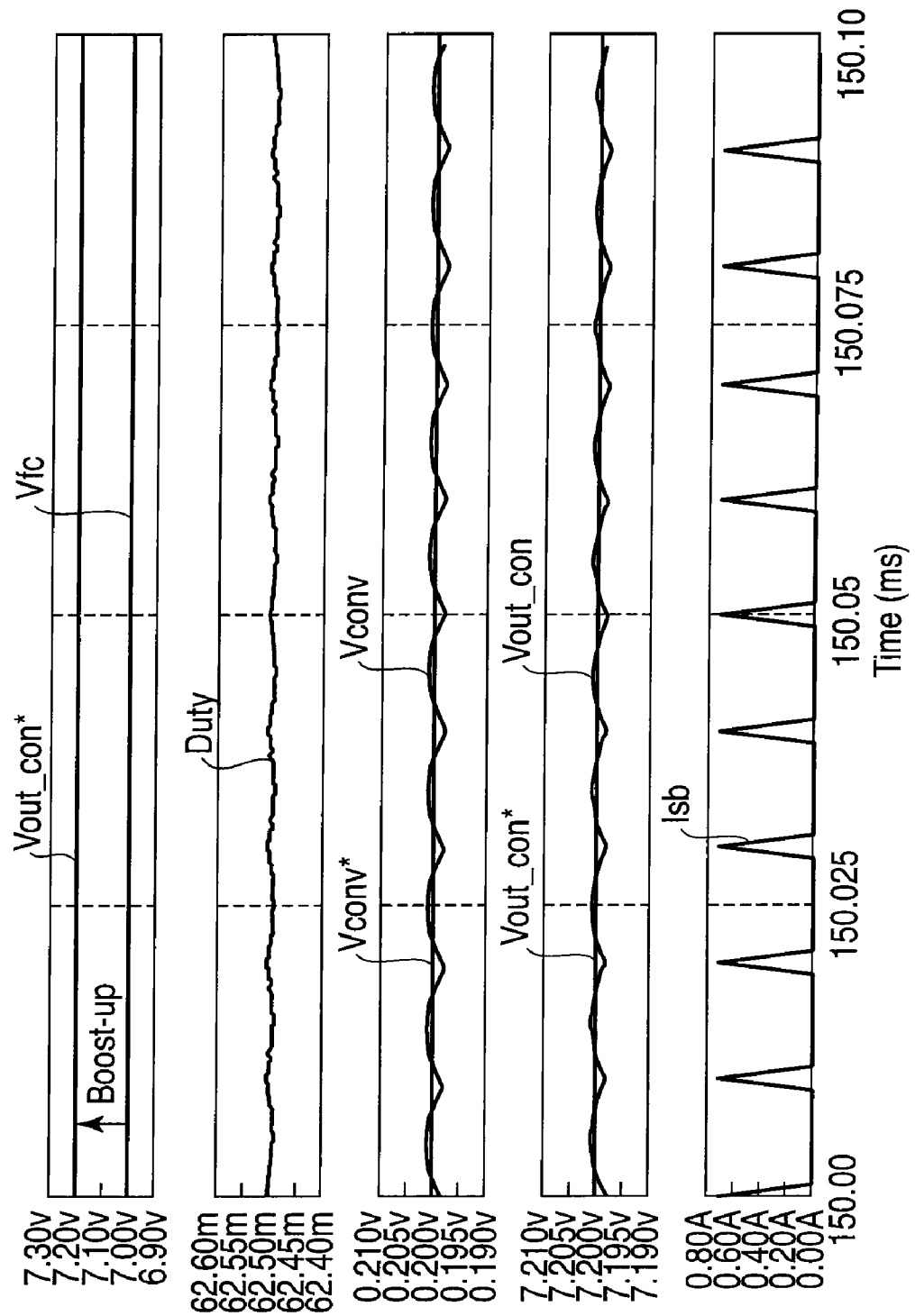
F I G. 8

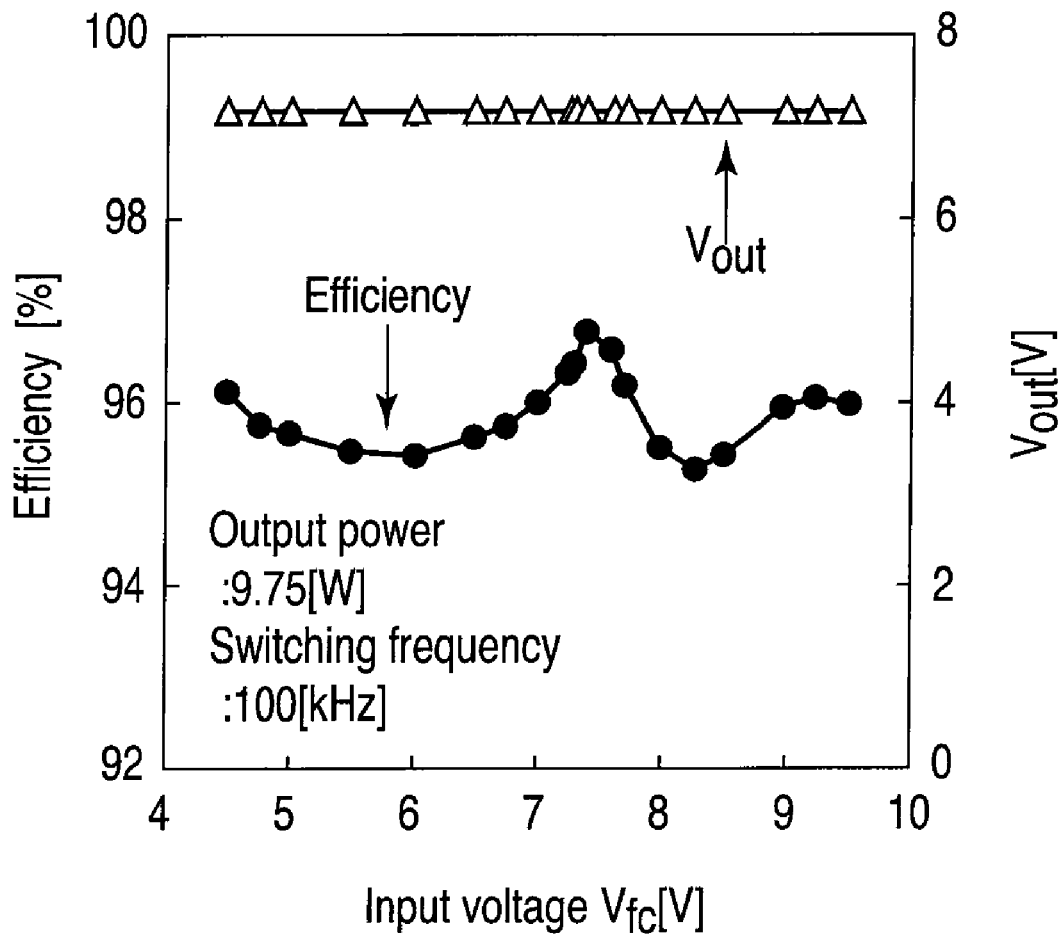
F I G. 10

DUAL-POWER-SUPPLY SYSTEM

CROSS REFERENCE TO RELATED APPLICATIONS

This is a Continuation application of PCT Application No. PCT/JP2008/070345, filed Nov. 7, 2008, which was published under PCT Article 21(2) in Japanese.

This application is based upon and claims the benefit of priority from prior Japanese Patent Application No. 2007-295496, filed Nov. 14, 2007, the entire contents of which are incorporated herein by reference.

BACKGROUND OF THE INVENTION

1. Field of the Invention

The present invention relates to a dual-power-supply system using both a fuel cell that generates power by a chemical reaction of fuel such as methanol or hydrogen, and a chargeable secondary battery such as a lithium ion battery.

2. Description of the Related Art

Portable information apparatuses such as cellular phones, PDAs, and digital cameras mainly use chargeable secondary batteries such as lithium ion batteries as power supplies. Recently, as demands have arisen for high-performance, high-speed, multifunctional apparatuses that can be driven for long time periods, as the power supplies, it is anticipated that compact fuel cells will be used, and some fuel cells are beginning to be manufactured or used in trials.

Fuel cells do not require to be charged, unlike conventional secondary batteries, and can drive apparatuses for long time periods by merely replenishing the fuel or exchanging fuel cartridges. Of these fuel cells, a fuel cell using methanol or the like as the fuel can provide a stable output for a long time but cannot provide output corresponding to the load condition of an apparatus to be used, owing to the characteristics of fuel cells. In particular, an apparatus such as a cellular phone or digital camera has a plurality of operation modes, and the necessary output of one mode may be twice or more that of another mode. Accordingly, a fuel cell cannot singly be used in any apparatus in such manner.

When using a fuel cell in an electronic apparatus as described above, therefore, a general approach is to use, e.g., a chargeable lithium ion secondary battery capable of coping with load fluctuations, in addition to the fuel cell. For example, U.S. Pat. No. 6,656,618 has disclosed a system using both a fuel cell and secondary battery by converting the output voltage from the fuel cell by a DC-DC converter.

BRIEF SUMMARY OF THE INVENTION

According to an aspect of the present invention, there is provided a dual-power-supply system using both a fuel cell and a chargeable secondary battery, comprising:

a differential voltage adding unit configured to add a differential voltage between a voltage of the fuel cell and a necessary target output voltage to the voltage of the fuel cell by using the secondary battery, thereby obtaining an output voltage of the dual-power-supply system; and a control unit configured to detect the output voltage of the dual-power-supply system, and control the differential voltage adding unit such that the output voltage is equal to the target output voltage.

Advantages of the invention will be set forth in the description which follows, and in part will be obvious from the description, or may be learned by practice of the invention.

Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a view showing the configuration of a dual-power-supply system according to a first embodiment of the present invention;

FIG. 4 is a view showing a configuration example of a comparison circuit shown in FIG. 1;

FIG. 5 is a view showing the relationship between the input and output of a comparator in order to explain the operating principle of the comparison circuit shown in FIG. 4;

FIG. 8 is a view showing the relationship between the voltage of a fuel cell, a target output voltage, a differential voltage, a target differential voltage, a detected output voltage, and the battery current of a secondary battery, in a boost-up operation;

FIG. 10 is a view showing the measurement results of the converter efficiency when the voltage of the fuel cell is changed from 4.5 to 9.5 [V]

DETAILED DESCRIPTION OF THE INVENTION

Figure 2:
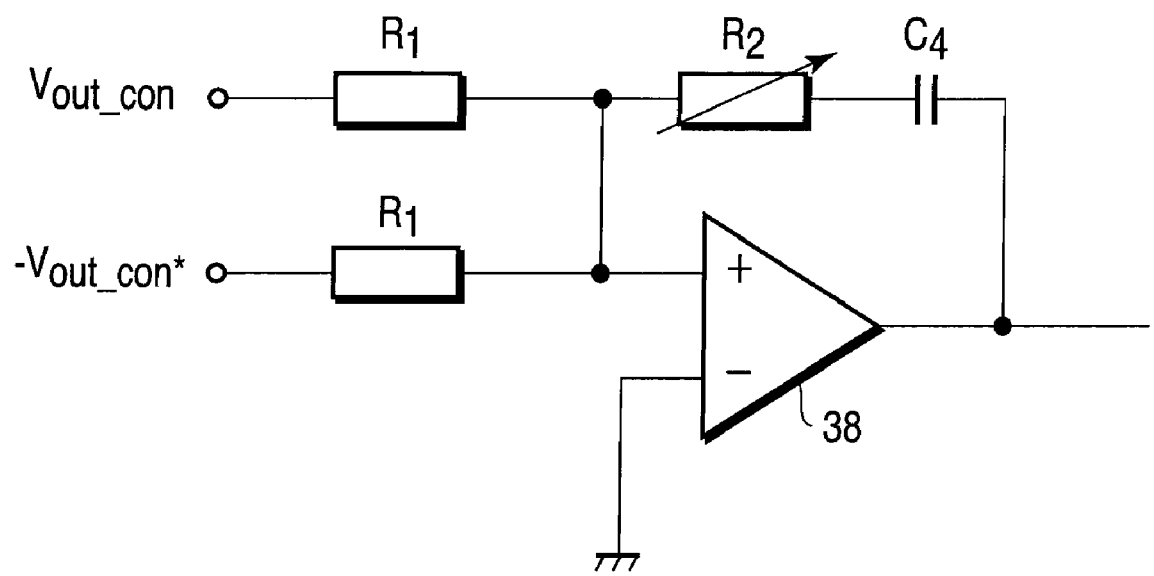
FIG. 2 is a view showing a configuration example of a PI control circuit shown in FIG. 1.

The best mode for carrying out the invention will be explained below with reference to the accompanying drawings.

First Embodiment

As shown in FIG. 1, a dual-power-supply system according to a first embodiment of the present invention includes a fuel cell $V_{fc}$ that generates power by a chemical reaction of a fuel such as methanol or hydrogen, and a chargeable secondary battery $V_{sb}$ such as a lithium ion battery. In a steady state, the voltage of the fuel cell $V_{fc}$ is 7.2 [V], and that of the secondary battery $V_{sb}$ is 3.2 [V]. Note that the fuel cell $V_{fc}$ cannot instantly output high power because it generates power by a chemical reaction.

The fuel cell $V_{fc}$ and secondary battery $V_{sb}$ are connected in series via an H-bridge type DC-DC converter 10. That is, the H-bridge type DC-DC converter 10 includes a four-quadrant chopper 12 and a LC low-pass filter 14. The secondary battery $V_{sb}$ is connected to the input terminal of the four-quadrant chopper 12. A capacitor $C_1$ is connected in parallel to the secondary battery $V_{sb}$. The fuel cell $V_{fc}$ is connected in series with a capacitor $C_2$ of the LC low-pass filter 14 including the capacitor $C_2$ and an inductance L connected to the output terminal of the four-quadrant chopper 12. A capacitor $C_3$ is connected in parallel to this series connection of the fuel cell $V_{fc}$ and capacitor $C_2$.

Power supply (an output voltage $V_{out}$) from this dual-power-supply system to a load Load is performed from between the two ends of the series connection of the fuel cell $V_{fc}$ and capacitor $C_2$.

In addition to the main circuit having the arrangement as described above, this dual-power-supply system includes a control circuit 18 for controlling the operation of the four-quadrant chopper 12 based on a detected output voltage $V_{out\_con}$ obtained by extracting the output voltage $V_{out}$ via an isolation amplifier 16.

The control circuit 18 includes a PI control circuit 20, a carrier generating circuit 22, a comparison circuit 24, an inverting amplification circuit 26, a comparison circuit 28, inverters 30 and 32, a dead time circuit 34, and a gate driving circuit 36.

The PI control circuit 20 performs PI control on a target output voltage $V_{out\_con}^*$ with respect to the detected output voltage $V_{out\_con}$ of the isolation amplifier 16. The carrier generating circuit 22 generates a triangular carrier wave. The comparison circuit 24 compares a modulation wave Duty as the output from the PI control circuit 20 with the triangular carrier wave from the carrier generating circuit 22. The inverting amplification circuit 26 multiplies the triangular carrier wave from the carrier generating circuit 22 by $-1$. The comparison circuit 28 compares the modulation wave Duty from the PI control circuit 20 with the inverted triangular carrier wave from the inverting amplification circuit 26.

The inverter 30 generates an inverted signal by inverting the output signal from the comparison circuit 24. The inverter 32 generates an inverted signal by inverting the output signal from the comparison circuit 28. The dead time circuit 34 delays the timings of the output signals from the comparison circuits 24 and 28 and the inverted signals from the inverters 30 and 32. The gate driving circuit 36 drives each switching element (power MOS-FET) of the four-quadrant chopper 12 in accordance with the outputs from the comparison circuits 24 and 28 and their inverted signals delayed by the dead time circuit 34.

The comparison circuit 24 (and inverter 30) corresponds to switching elements $Q_a$ and $-Q_a$ of the four-quadrant chopper 12. The comparison circuit 28 (and inverter 32) corresponds to switching elements $Q_b$ and $-Q_b$ of the four-quadrant chopper 12.

As shown in FIG. 2, the PI control circuit 20 includes an operational amplifier 38, two resistors $R_1$, a variable resistor $R_2$, and a capacitor $C_4$. The output from the PI control circuit 20 is represented by Expression (1) below. A gain $K_1$ and integral time constant $T_1$ are respectively represented by Expressions (2) and (3) below. Accordingly, it is possible to adjust the gain $K_1$ by the variable resistor $R_2$, and adjust the integral time constant $T_1$ by the capacitor $C_4$.

$$(V_{out\_con}^* - V_{out\_con})\left(1 + \frac{1}{R_2 C_4 s}\right)\frac{R_2}{R_1} \tag{1}$$

$$K_1 = \frac{R_2}{R_1} \tag{2}$$

$$T_1 = R_2 C_4 \tag{3}$$

Figure 3:
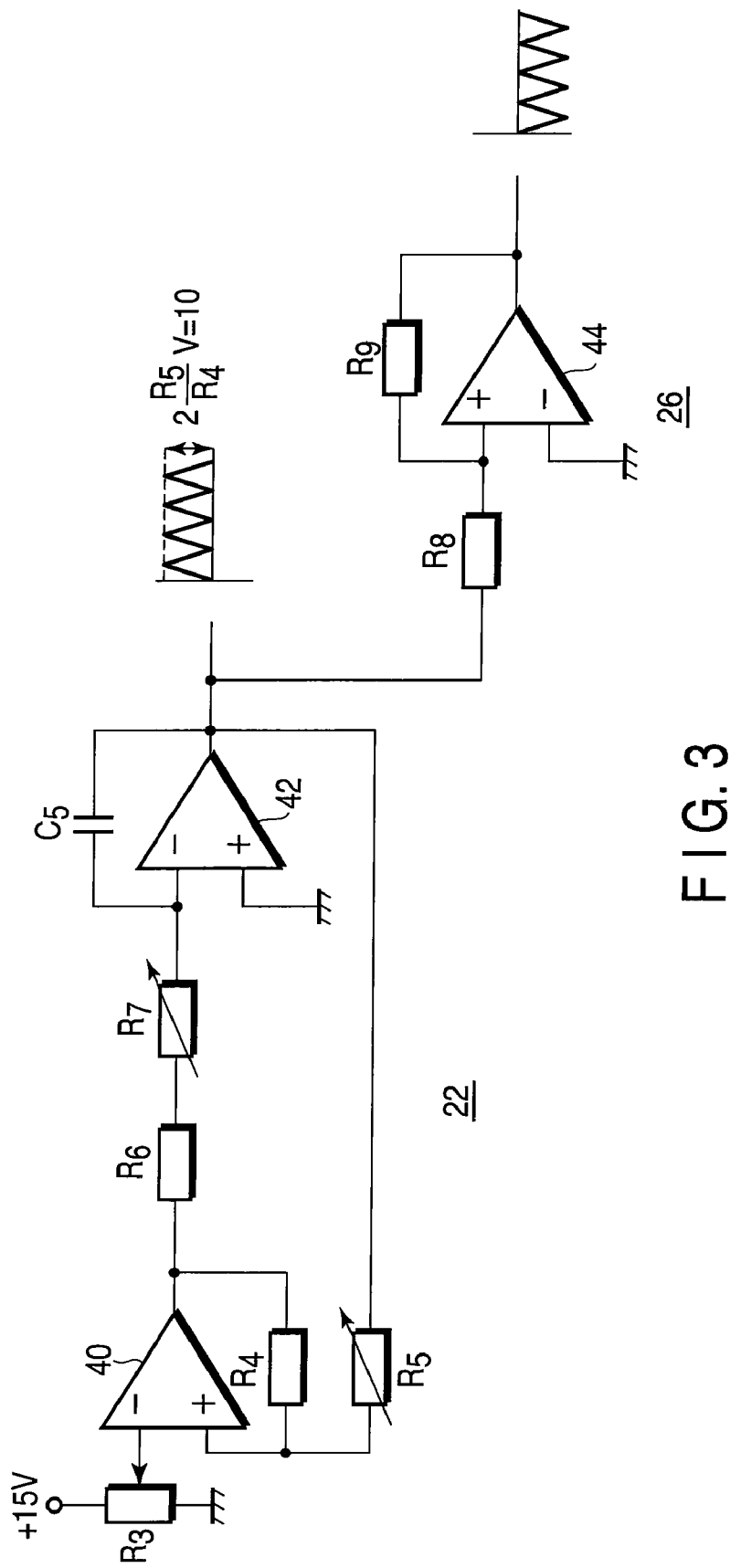
FIG. 3 is a view showing a configuration example of a carrier generating circuit and an inverting amplification circuit shown in FIG. 1.

As shown in FIG. 3, the carrier generating circuit 22 includes operational amplifiers 40 and 42, a variable resistor $R_3$, a resistor $R_4$, a variable resistor $R_5$, a resistor $R_6$, a variable resistor $R_7$, and a capacitor $C_5$. Also, the inverting amplification circuit 26 includes an operational amplifier 44 and resistors $R_8$ and $R_9$.

The carrier generating circuit 22 generates a triangular carrier wave having a frequency as indicated by $$f = \frac{1}{4(R_6 + R_7)C_4}\left(\frac{R_4}{R_5}\right) \tag{4}$$

The carrier generating circuit 22 includes a hysteresis comparator using an operational amplifier 40, and an integrating circuit using an operational amplifier 42. The variable resistors $R_3$, $R_5$, and $R_7$ respectively adjust the DC component, amplitude, and frequency of the triangular wave. For example, the amplitude of the triangular wave is $2(R_5/R_4)V$. When $V=15$ [V], $R_4=6$ [k$\Omega$], and $R_5$ is adjusted to 2 [k$\Omega$], the amplitude is 10 [$V_{pp}$]. This triangular wave is used as a carrier corresponding to the switching elements $Q_a$ and $-Q_a$ of the four-quadrant chopper 12.

The inverting amplification circuit 26 using the operational amplifier 44 generates an inverted triangular wave by inverting the triangular wave described above. This inverted triangular wave is used as a carrier corresponding to the switching elements $Q_b$ and $-Q_b$ of the four-quadrant chopper 12.

Attention should be paid to the slew rate when setting the carrier frequency at a high frequency such as 100 [kHz]. Therefore, LM7171 (National Semiconductor) is used as each of the operational amplifiers 40, 42, and 44, and the slew rate is 4,100 [V/µs]. Expression (5) below indicates the relationship between the slew rate and carrier frequency. When the amplitude of the triangular carrier wave is 10 [$V_{pp}$], a carrier frequency f can be set up to 200 [MHz].

$$f \le \frac{SlewRate[V/\mu s]}{2 \times V_{pp}} \times 10^6 \tag{5}$$

As shown in FIG. 4, the comparison circuits 24 and 28 each include a comparator 46 and resistor $R_{10}$. In each of the comparison circuits 24 and 28, the comparator 46 compares the triangular carrier wave from the carrier generating circuit 22 or inverting amplification circuit 26 with the modulation wave Duty from the PI control circuit 20, and outputs the result to a succeeding circuit. As the comparator 46, it is possible to use, e.g., LM319 having a high response time of 80 [ns]. Note that LM319 has an open collector, so the voltage is pulled up to 5 [V] via the pull-up resistor $R_{10}$.

FIG. 5 is a view showing results obtained when a triangular carrier wave 48 at about 100 [kHz] and a DC voltage of 5 [V] are input to the comparator 46, and a comparator output 50 is observed with an oscilloscope. As shown in FIG. 5, a PWM waveform having a pulse width corresponding to the result of comparison of the triangular carrier wave 48 and 5 [V] is obtained as the comparator output 50. Note that the resistance value of the pull-up resistor $R_{10}$ determines the delay time of the leading edge of the comparator output 50.

In the configuration shown in FIG. 1, the triangular carrier wave from the carrier generating circuit 22 or inverting amplification circuit 26 is input, instead of the triangular carrier wave 48 as described above, to the inverting input terminal of the comparator 46. Also, the modulation wave Duty from the PI control circuit 20 is input, instead of a DC voltage of 5 [V], to the noninverting input terminal of the comparator 46. Consequently, a PWM waveform whose pulse width varies in accordance with fluctuations in modulation wave Duty is obtained from the output terminal of the comparator 46.

Figure 6:
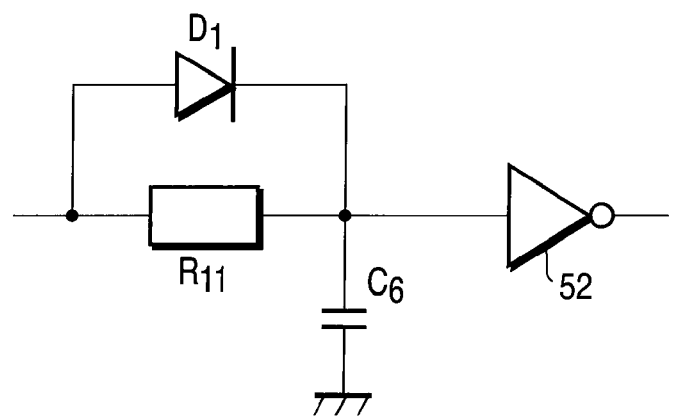
FIG. 6 is a view showing a configuration example of a dead time circuit shown in FIG. 1.

As shown in FIG. 6, the dead time circuit 34 includes a resistor $R_{11}$, a diode $D_1$, a capacitor $C_6$, and a Schmitt trigger 52. Note that FIG. 6 shows an arrangement for one switching element (power MOS-FET) of the four-quadrant chopper 12, and each switching element is provided with the same arrangement.

The OFF time of a power MOS-FET is generally longer than the ON time. This makes it necessary to use the dead time circuit for delaying the ON timing in accordance with the OFF time at the ON/OFF switching timing of power MOS-FET in position where it is shortcircuited if simultaneously turned on. The delay time is determined by the input capacitance or switching characteristic of the power MOS-FET.

In the arrangement shown in FIG. 6, a dead time $t_d$ as indicated by Expression (6) below is obtained. Note that the Schmitt trigger 52 generates a waveform after the original waveform is dulled by an RC filter that includes the resistor $R_{11}$ and capacitor $C_6$.

$$T_d = 0.7 C_6 R_{11} \tag{6}$$

It is undesirable to directly drive each switching element of the four-quadrant chopper 12 by the PWM signal delayed by the dead time circuit 34 as described above. This is because noise from the main circuit enters the control circuit 18 and causes an operation error because there is no electrical insulation. Accordingly, the gate driving circuit 36 drives each switching element (power MOS-FET) of the four-quadrant chopper 12. A gate driving IC forming the gate driving circuit 36 receives the PWM signal, performs current amplification on the signal, and outputs the obtained signal. Since the power MOS-FET is capacitive, the gate driving IC must be capable of rapidly charging and discharging the capacitance as a load.

The operation of the dual-power-supply system having the configuration as described above will be explained below.

This dual-power-supply system makes the voltage (output voltage $V_{out}$) to be supplied to the load Load constant by generating the difference between the voltage of the fuel cell $V_{fc}$ and the target output voltage $V_{out\_con}$ as an output voltage (differential voltage $V_{conv}$) from the H-bridge type DC-DC converter 10. That is, the output voltage $V_{out}$ is controlled to a constant voltage by controlling the differential voltage $V_{conv}$ by using the H-bridge type DC-DC converter 10 powered by the secondary battery $V_{sb}$. Note that the H-bridge type DC-DC converter 10 includes an LC low-pass filter for removing a switching ripple. The advantage of this method is that the power requirement of the power converter for maintaining the voltage $V_{fc}$ of the fuel cell constant can be reduced. This makes it possible to downsize the dual-power-supply system and increase the efficiency of the system. The differential voltage $V_{conv}$ is represented by Expression (7) below in accordance with the modulation wave Duty of PWM control. The output voltage $V_{out}$ is represented by Expression (8) below.

$$V_{conv} = \text{Duty} \times V_{sb} \tag{7}$$

$$V_{out} = V_{fc} + V_{conv} \tag{8}$$

Figure 7:
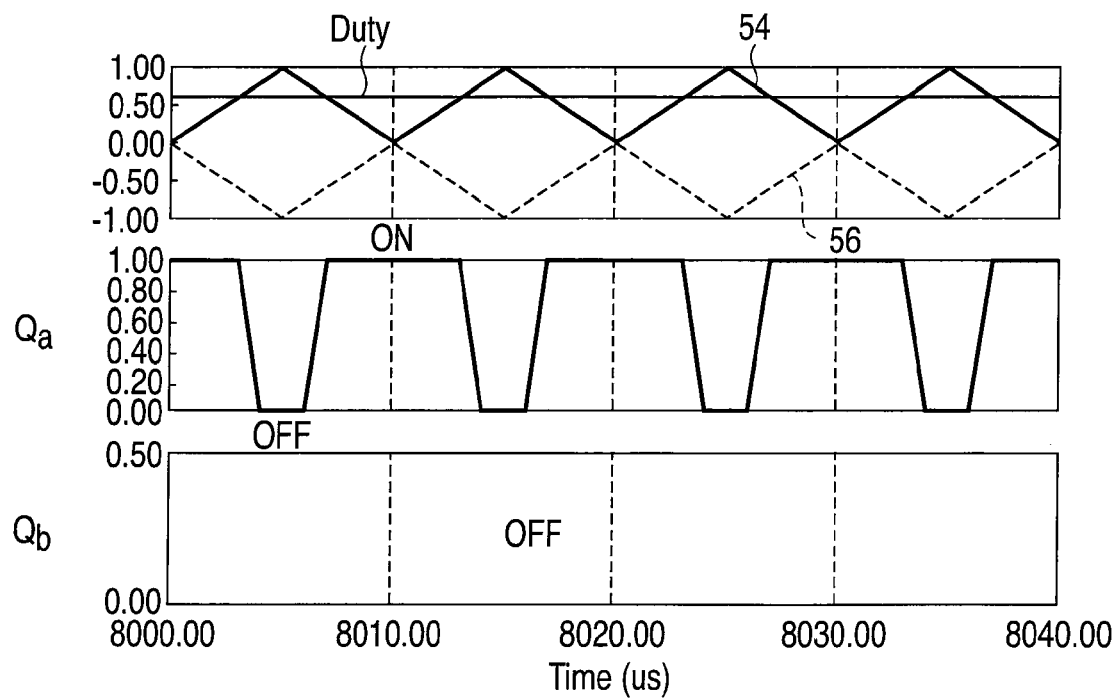
FIG. 7 is a view showing the relationship between a modulation wave, triangular wave carriers, and the states of switching elements $Q_a$ and $Q_b$.

FIG. 7 is a view showing the relationship between the modulation wave Duty from the PI control circuit 20, triangular carrier waves 54 and 56 from the carrier generating circuit 22 and inverting amplification circuit 26, and the states of the switching elements $Q_a$ and $Q_b$ of the four-quadrant chopper 12. FIG. 7 shows a state in which the voltage of the fuel cell $V_{fc}$ is low, and the difference between the fuel cell $V_{fc}$ and target output voltage $V_{out\_con}^*$ is positive, i.e., a boost-up operation must be performed. In this state, the modulation wave Duty is positive. Hence, the switching elements $Q_a$ and $-Q_a$ complementarily operate, the switching element $Q_b$ is normally OFF, and the switching element $-Q_b$ is normally ON.

Although not shown, when the voltage of the fuel cell $V_{fc}$ is high, and the difference between the fuel cell $V_{fc}$ and target output voltage $V_{out\_con}^*$ is negative, i.e., a step-down operation must be performed, the modulation wave Duty is negative, the switching elements $Q_b$ and $-Q_b$ complementarily operate, the switching element $Q_a$ is normally OFF, and the switching element $-Q_a$ is normally ON.

Figure 9:
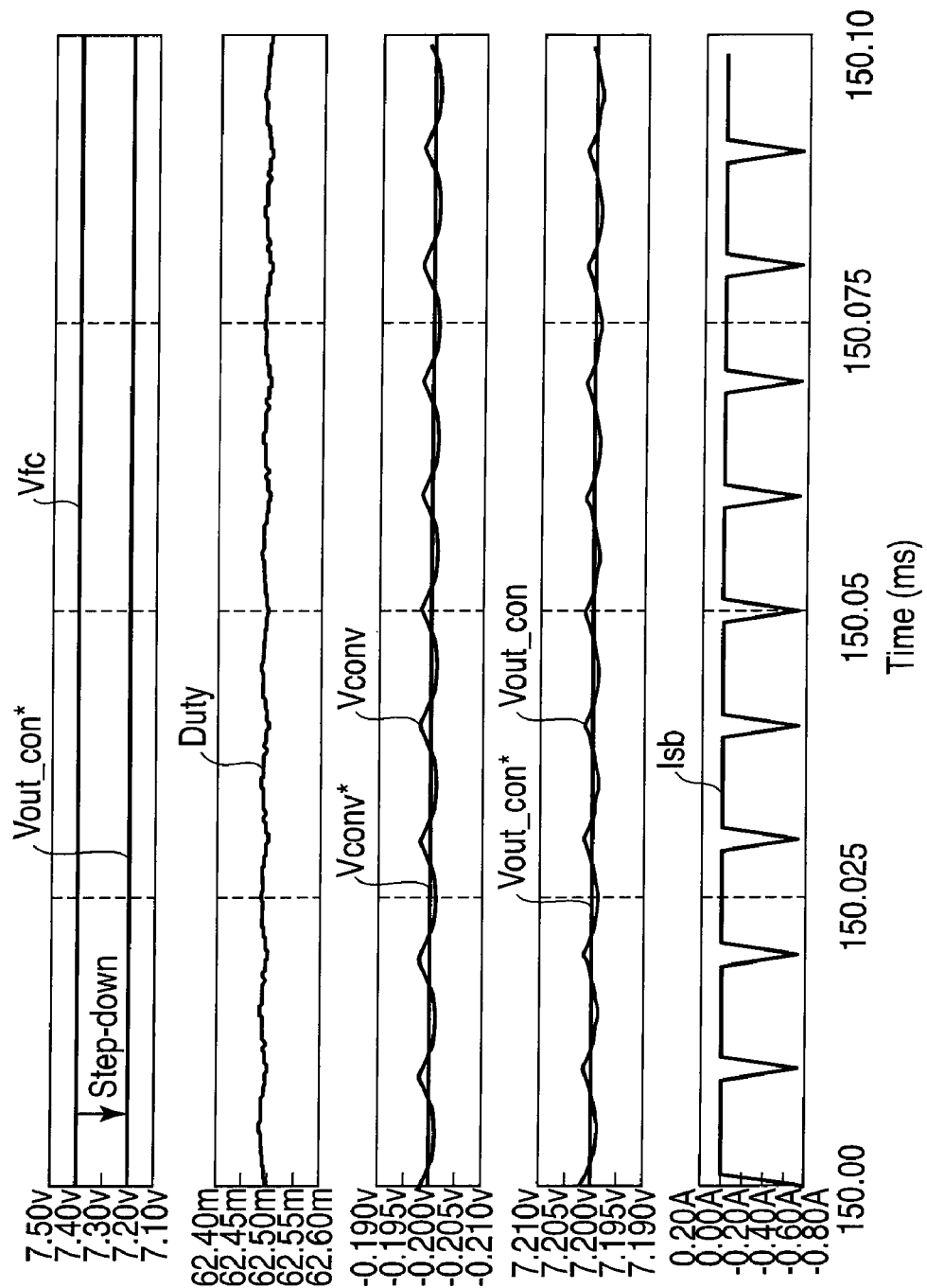
FIG. 9 is a view showing the relationship between the voltage of the fuel cell, the target output voltage, the differential voltage, the target differential voltage, the detected output voltage, and the battery current of the secondary battery, in a step-down operation.

FIGS. 8 and 9 are views showing the relationship between the voltage of the fuel cell $V_{fc}$, the target voltage $V_{out\_con}^*$, the modulation wave Duty, the differential voltage $V_{conv}$, a target differential voltage $V_{conv}^*$, the detected output voltage $V_{out\_con}$, and a battery current $I_{sb}$ of the secondary battery $V_{sb}$ in the boost-up operation and step-down operation, respectively. Referring to FIGS. 8 and 9, $V_{conv}^* = V_{out\_con}^* - V_{fc}$. In the boost-up operation as shown in FIG. 8, the modulation wave Duty is positive, and the differential voltage $V_{conv}$ is positive under the control of the H-bridge type DC-DC converter 10. In this state, the secondary battery $V_{sb}$ repeats pulse discharge. In the step-down operation as shown in FIG. 9, the modulation wave Duty is negative, and the differential voltage $V_{conv}$ is negative under the control of the H-bridge type DC-DC converter 10. In this state, the secondary battery $V_{sb}$ repeats pulse charge. Consequently, the output voltage $V_{out}$ can be controlled to be almost constant at 7.2 [V]. Note that the differential voltage $V_{conv}$ oscillates because the control system of the differential voltage $V_{conv}$ is a secondary system under the PI control.

FIG. 10 is a view showing the measurement results of the converter efficiency when the voltage of the fuel cell $V_{fc}$ is changed from 4.5 to 9.5 [V]. The target output voltage $V_{out\_con}^*$ is 7.2 [V]. The closer the voltage of the fuel cell $V_{fc}$ to 7.2 [V] as the target, the higher the efficiency. Note that the efficiency rises in a region where the differential voltage $V_{conv}$ is high, because the efficiency of the H-bridge type DC-DC converter 10 increases as the output power of the H-bridge type DC-DC converter 10 increases.

In the dual-power-supply system according to the first embodiment as described above, the voltage (output voltage $V_{out}$) to be supplied to the load Load can be made constant by generating, as a part of the output voltage $V_{out}$, the difference between the fuel cell $V_{fc}$ and target output voltage $V_{out\_con}^*$ as the output voltage (differential voltage $V_{conv}$) of the H-bridge type DC-DC converter 10. That is, the delay of power supply by the fuel cell $V_{fc}$ can be compensated for by controlling the H-bridge type DC-DC converter 10 using the secondary battery $V_{sb}$ as the input source of the differential voltage $V_{conv}$.

Also, the voltage to be generated by the H-bridge type DC-DC converter 10 need only be the difference between the voltage of the fuel cell $V_{fc}$ and the target output voltage $V_{out\_con}*$. Accordingly, the converter capacity can be made smaller than that of a DC-DC converter that generates a target output voltage by simply increasing or decreasing the battery voltage. Since the converter is downsized and lightened, therefore, it is possible to downsize and lighten an electronic apparatus incorporating the dual-power-supply system. In addition, since the converter capacity is smaller, the overall efficiency increases, and the battery life lengthens.

More specifically, when the H-bridge type DC-DC converter 10 compensates for ±30% of the voltage, for example, the converter capacity can be decreased to ⅓, and the size also decreases to ⅓ because the size is nearly proportional to the capacity. Since the loss is also proportional to the capacity, the loss decreases to ⅓. That is, when the loss is 30%, the battery life can be lengthened by about 30%.

Furthermore, when the output voltage $V_{out}$ is higher than the target output voltage $V_{out\_con}*$, the consumption of the secondary battery $V_{sb}$ can be recovered by charging it.

Second Embodiment

Although the control circuit 18 is implemented by hardware in the above-mentioned first embodiment, the functions as described above are implemented by internal software of DSP by replacing the PI control circuit 20, carrier generating circuit 22, comparison circuits 24 and 28, inverting amplification circuit 26, and inverters 30 and 32 with DSP.

The second embodiment as described above can reduce the size of circuitry compared to the configuration entirely implemented by hardware. This further downsizes and lightens the system.

It is also possible to add signal processing such as filtering.

Third Embodiment

In the first embodiment described above, the secondary battery $V_{sb}$ performs pulse discharge in the boost-up operation, and pulse charge in the step-down operation.

Figure 11:
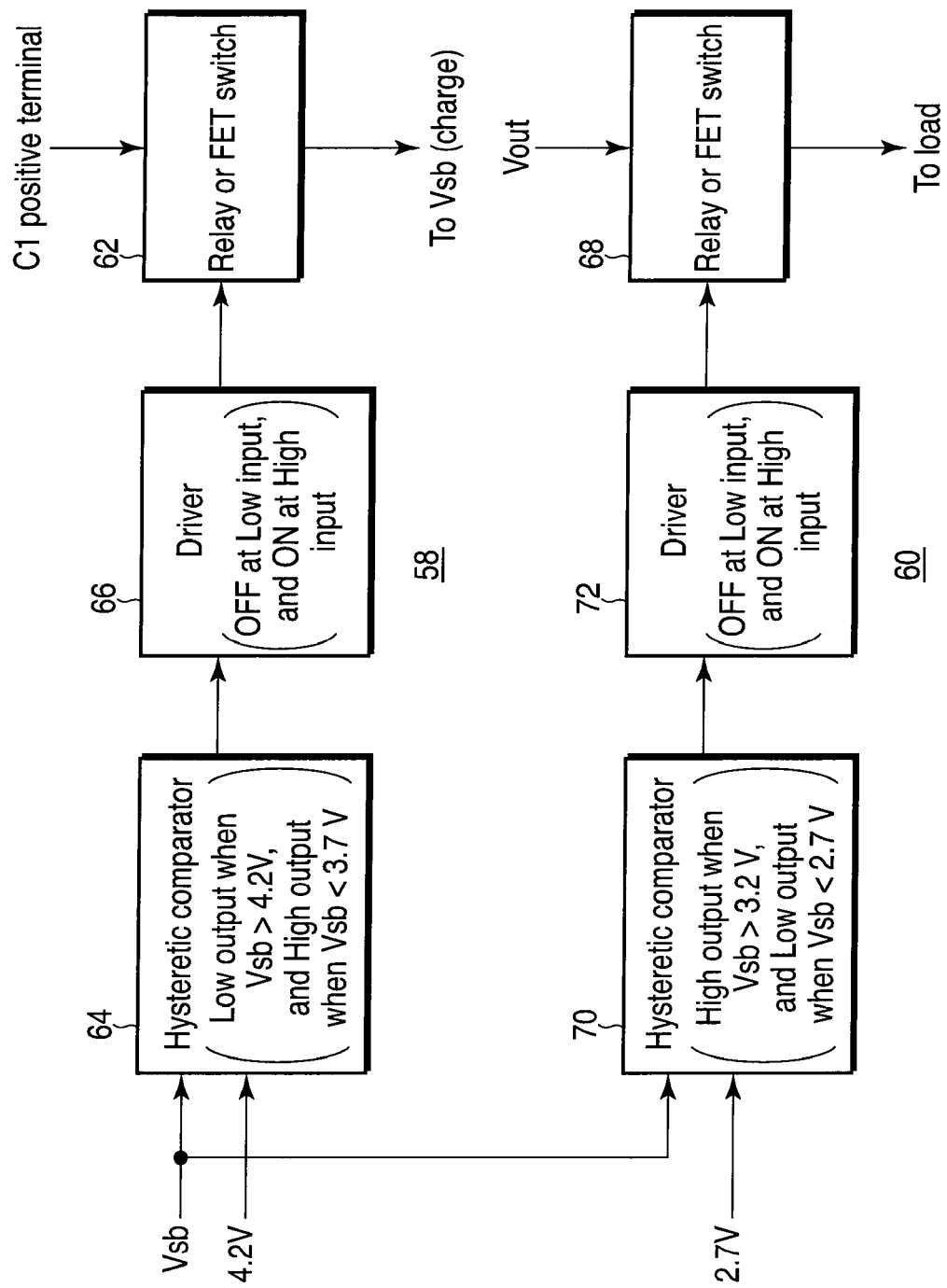
FIG. 11 is a view showing a configuration example of an overcharge protecting circuit and an overdischarge protecting circuit of a secondary battery in a dual-power-supply system according to a third embodiment of the present invention.

As shown in FIG. 11, therefore, a third embodiment further includes an overcharge protecting circuit 58 and an overdischarge protecting circuit 60 for preventing overcharge and overdischarge of the secondary battery $V_{sb}$.

That is, the overcharge protecting circuit 58 includes a relay or FET switch 62, a hysteretic comparator 64, and a driver 66. The relay or FET switch 62 is formed between the secondary battery $V_{sb}$ and a node between the positive terminal of a capacitor $C_1$ and a four-quadrant chopper 12. The hysteretic comparator 64 changes to a Low output when the voltage of the secondary battery $V_{sb}$ exceeds 4.2 [V], and does not return from the Low output to the original High output unless the voltage decreases below 3.7 [V] rather than 4.2 [V]. The driver 66 drives the relay or FET switch 62 so as to turn it off when the output of the comparator 64 is Low, and turn it on when the output is High.

Accordingly, the overcharge protecting circuit 58 as described above can perform control so as to interrupt charging when the voltage of the secondary battery $V_{sb}$ exceeds 4.2 [V], and resume charging when the voltage of the secondary battery $V_{sb}$ decreases below 3.7 [V].

The overdischarge protecting circuit 60 includes a relay or FET switch 68, a hysteretic comparator 70, and a driver 72. The relay or FET switch 68 is formed between one terminal of a load Load and one end of the series connection of a fuel cell $V_{fc}$ and capacitor $C_2$. The hysteretic comparator 70 changes to a Low output when the voltage of the secondary battery $V_{sb}$ decreases below 2.7 [V], and does not return from the Low output to the original High output unless the voltage exceeds 3.2 [V] rather than 2.7 [V]. The driver 72 drives the relay or FET switch 68 so as to turn it off when the output of the comparator 70 is Low, and turn it on when the output is High.

Accordingly, the overdischarge protecting circuit 60 as described above can perform control so as to inhibit the supply of an output voltage $V_{out}$ from the dual-power-supply system to the load Load when the voltage of the secondary battery $V_{sb}$ decreases below 2.7 [V], thereby preventing the voltage of the secondary battery $V_{sb}$ from further decreasing, and supply the output voltage $V_{out}$ to the load Load when the voltage of the secondary battery $V_{sb}$ becomes 3.2 [V] or more. Note that in this case, it is favorable to notify the user by a notifying means such as an LED that the power supply is stopped due to the decrease in capacity of the secondary battery $V_{sb}$.

Although the present invention has been explained based on the embodiments, the invention is not limited to the above-mentioned embodiments, and various modifications and applications can of course be made within the spirit and scope of the invention.

For example, the control circuit 18 is not limited to the arrangement shown in FIG. 1 (and FIGS. 2, 3, 4, 5, and 6), and can have any arrangement as long as the H-bridge type DC-DC converter 10 can be controlled such that the output voltage $V_{out}$ is equal to the target output voltage $V_{out\_con}*$.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A dual-power-supply system using both a fuel cell and a chargeable secondary battery, comprising:
   a differential voltage adding unit configured to add a differential voltage between a voltage of the fuel cell and a necessary target output voltage to the voltage of the fuel cell by using the secondary battery, thereby obtaining an output voltage of the dual-power-supply system; and
   a control unit configured to detect the output voltage of the dual-power-supply system, and to control the differential voltage adding unit such that the output voltage is equal to the target output voltage.

2. A dual-power-supply system according to claim 1, wherein the control unit controls the differential voltage adding unit to add a positive differential voltage to the voltage of the fuel cell when the output voltage is lower than the target output voltage, and to add a negative differential voltage to the voltage of the fuel cell when the output voltage is higher than the target output voltage.

3. A dual-power-supply system according to claim 2, wherein the differential voltage adding unit adds the positive differential voltage to the voltage of the fuel cell by pulse discharging the secondary battery, and adds the negative differential voltage to the voltage of the fuel cell by pulse charging the secondary battery.

4. A dual-power-supply system according to claim 3, further comprising an overcharge and overdischarge preventing unit configured to prevent overcharge and overdischarge of the secondary battery.

* * * * *